Sept. 19, 1933.   H. W. RUPPLE   1,927,419
SCREW CUTTING MACHINE
Filed Aug. 31, 1928   5 Sheets-Sheet 2

INVENTOR.
Harry W. Rupple
BY
ATTORNEY

INVENTOR.
Harry W. Rupple
BY Fay, Oberlin & Fay
ATTORNEY.

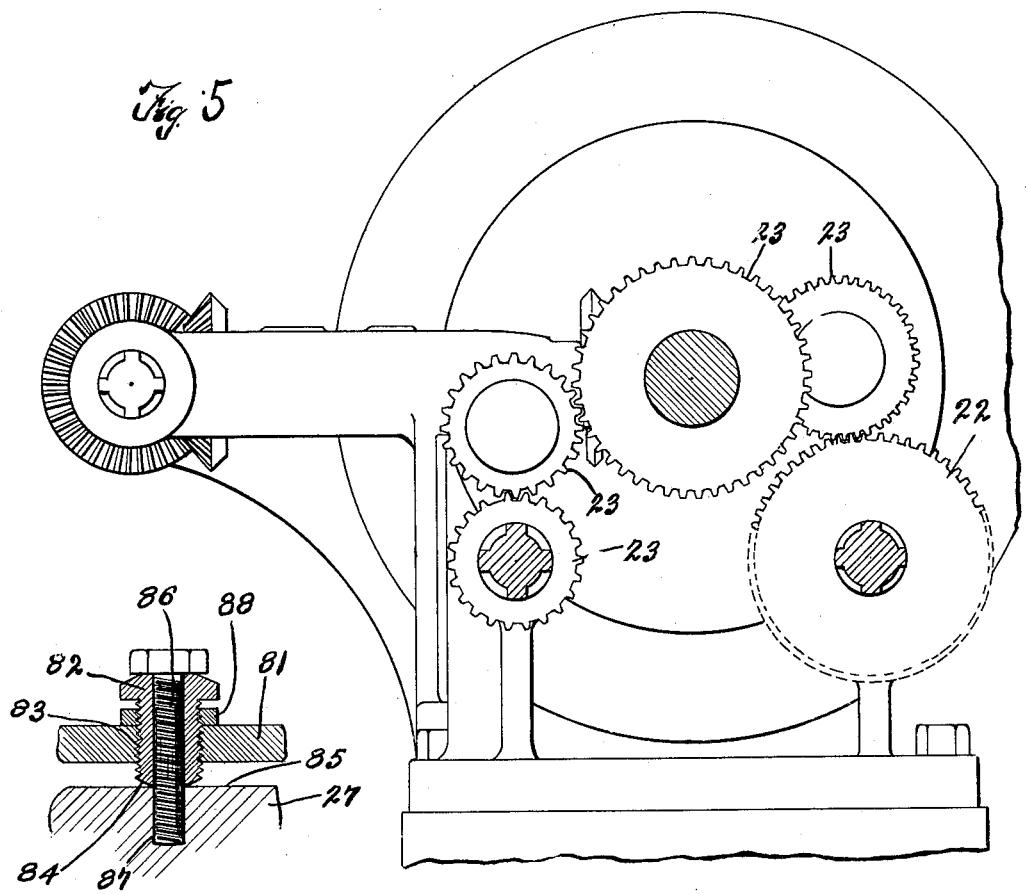
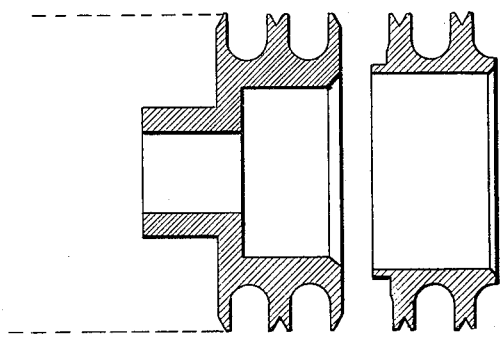

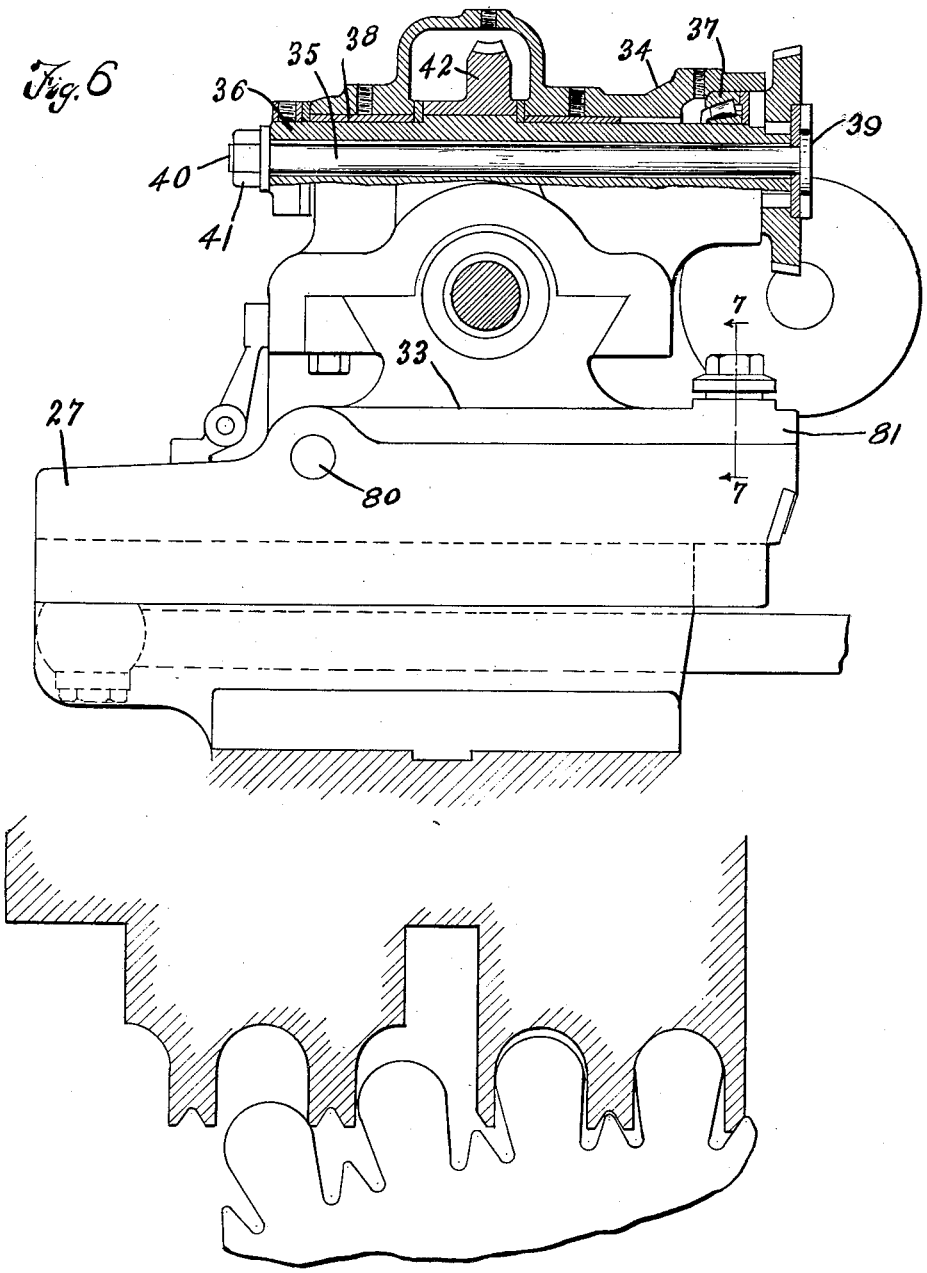

Patented Sept. 19, 1933

1,927,419

UNITED STATES PATENT OFFICE 1,927,419

SCREW CUTTING MACHINE

Harry W. Rupple, Cleveland, Ohio, assignor to The Cleveland Automatic Machine Company, Cleveland, Ohio, a corporation of Ohio Application August 31, 1928. Serial No. 303,342

15 Claims. (Cl. 29—57)

The present invention relates, as indicated, to automatic machines of the metal-working class, and refers more particularly to a new and improved multiple spindle automatic machine wherein a plurality of stock bars or blanks are supported for rotation and a number of forming tools carried in opposed relation to said blanks are employed to engage the several blanks collectively during each step in the cycle of the operation of the machine.

My invention contemplates the provision of an automatic machine having a spindle turret revolubly supporting a plurality of work-holding spindles, and having a tool slide carrying a number of cutting tools adapted to cooperate with said spindles to efficiently and expeditiously produce finished articles from bars of stock intermittently fed through the spindles. The machine herein provided is simple in construction, automatic in every operation, and capable of producing a better quality of work in greater capacity than existing machines of the same general character. In securing this end I have devised the present novel multiple spindle automatic machine, in which are embodied certain important improvements capable of being utilized in machines other than the exact form disclosed herein.

One of the objects of the invention is to provide in connection with the blank rotating and holding mechanism and the several forming tools, other new and improved means which are adapted to function conjunctively with said tools to produce external threads of the well-known worm variety upon the work.

Another object of my invention is to provide, in the form of a readily removable attachment device, a simple and efficient mechanism which may be carried by and operated from the ordinary parts of a multiple spindle screw-cutting machine, such mechanism being so designed as to cut precision worm threads on the stock bars carried by the machine. In machines of this class, as mentioned above, several stock bars are carried in paraxial arrangement in an indexible spindle turret, with means for causing the continuous rotation of the spindles, and forming tools are provided which successively engage the several stock bars at each step in the cycle of the turret operation, these tools being mounted on a reciprocating tool slide. This slide is moved in timed relation with the indexing mechanism, and other slides, also simultaneously operated, are carried by the machine transversely of the spindles. An important advantage of the present invention is the utilization of the various slides, both transverse and longitudinal, for mounting and actuating the worm thread generating mechanism.

A still further object hereof is to provide means whereby the cutter, i. e., the worm thread cutting tool, may be easily adjusted in planes vertically, horizontally, and longitudinally of the work, it being assumed that such work is carried in a horizontal plane.

To the accomplishment of the foregoing and related ends, said invention then consists of the means hereinafter fully described and particularly pointed out in the claims. The annexed drawings and following description set forth in detail certain mechanism embodying the invention, such disclosed means constituting, however, but one of various mechanical forms in which the principle of the invention may be used.

In said annexed drawings,

Fig. 5 is a cross-sectional view taken on line 5—5 of Fig. 2;

Fig. 6 is a cross-sectional view taken on line 6—6 of Fig. 2, the tool slide and its mounting being shown in elevation;

Fig. 7 is a detail sectional view taken on line 7—7 of Fig. 6;

Fig. 8 is a fragmentary view on a greatly enlarged scale illustrating the engagement of the tool with the work; and Fig. 9 is a cross-sectional view taken through one form of completed article.

Figure 1:
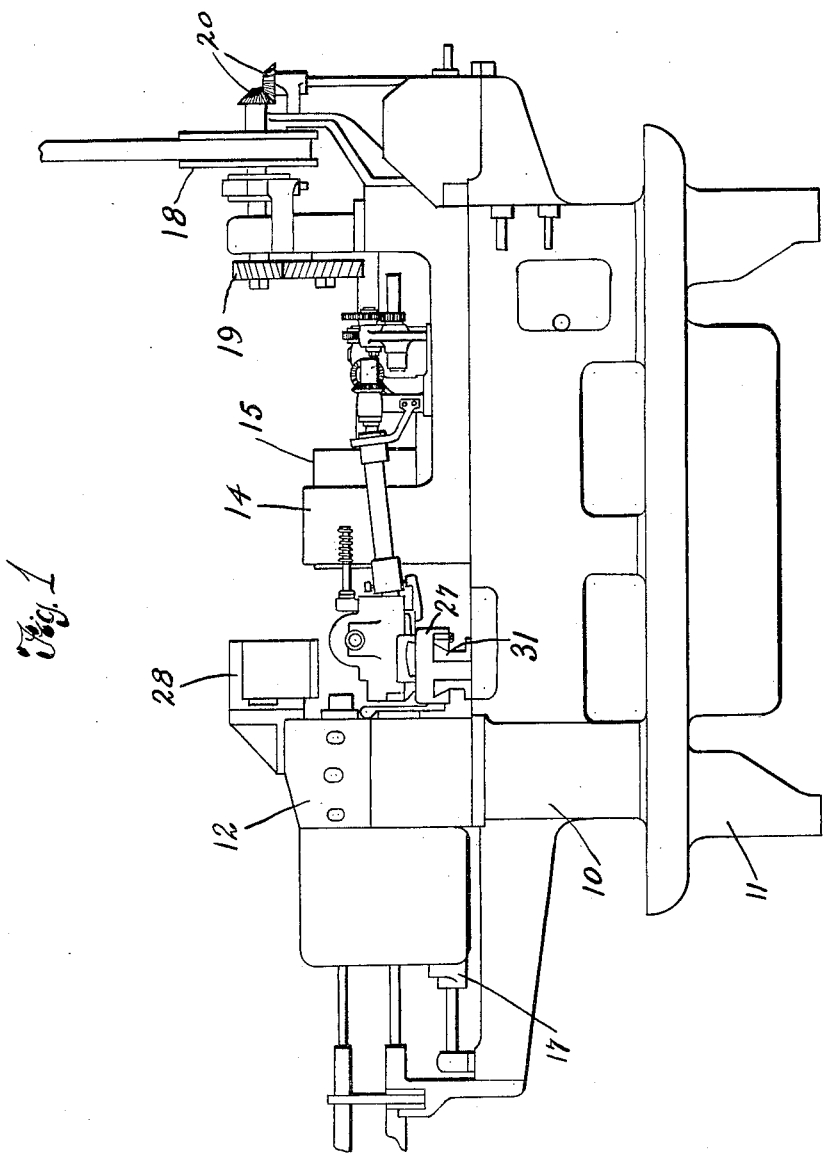
Fig. 1 is a front elevation of a preferred form of multiple spindle machine embodying the new and improved features of this invention.

In the illustrated embodiment of the present invention, I have shown and described a "Cleveland automatic" type of multiple spindle machine, it being understood, however, that the present invention is not limited to any particular form or type of machine. In such illustration, 10 indicates the horizontal bed of the machine supported on a suitable standard 11 and having secured to its upper surface a housing 12 in which the spindle turret 13 is rotatably mounted and also an upright housing 14 suitably apertured to slidably receive a tool slide 15. The spindle turret carries a plurality of circumferentially arranged rotating spindles 16, which are of ordinary construction, to receive and hold therein stock bars which will be hereinafter designated by W. Means in the form of a longitudinal reciprocating member 17 is provided for intermittently feeding the stock through one or more of said spindles at a selected position, this latter device being shown only diagrammatically as it forms no part of the present invention. Mounted at one end of the machine is a pulley 18 which may be driven from any suitable source of power and which is connected through sets of gears 19 and 20 to the several operating elements of the machine. A shaft 21, which will be referred to hereinafter as the main or spindle drive shaft, is mounted axially of the spindle turret and the tool slide 15, suitable connections being provided between the pulley 18 and the shaft 21 to effect the rotation of the latter. The several spindles 16 are driven in the usual manner from gearing provided internally of the spindle turret and engaging with a spur gear mounted on the shaft 21.

Figure 2:
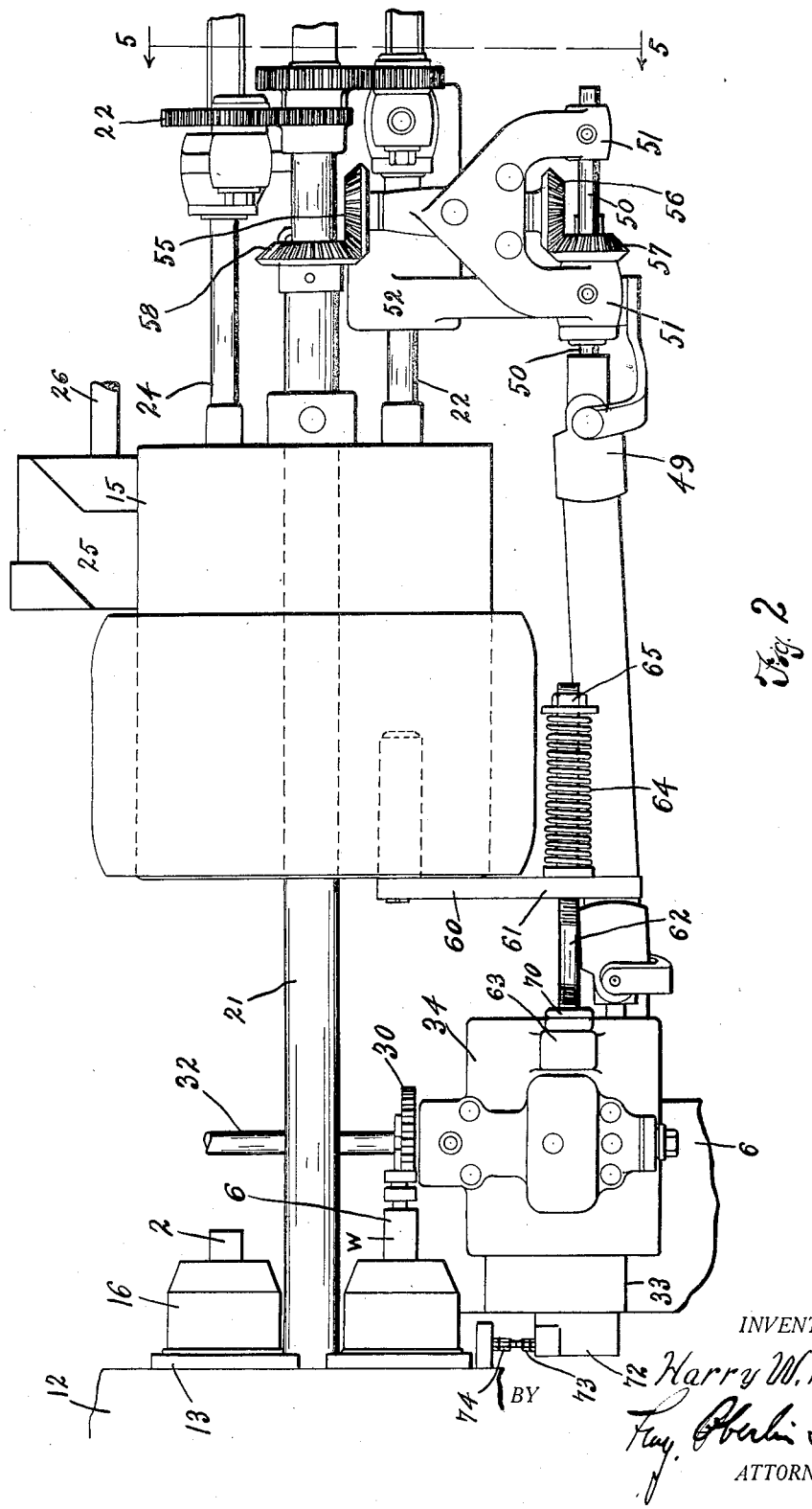
Fig. 2 is a plan view on an enlarged scale of the front end of the spindle turret and the tool-carrying devices.

The tool slide 15 is provided with a number of tool-receiving apertures preferably arranged coaxially of the several spindles 16, and suitable gearing 22 and 23, as seen in Figs. 2 and 5, may be employed to rotatably connect the tool spindles 24 to the drive shaft 21. The tool slide 15 is reciprocated during each step of the indexing of the spindle turret by means of a continuously rotating cam 25 mounted on a shaft 26 driven through suitable gearing (not shown) from the pulley 18. Thus one completed article is formed at each reciprocation of the tool slide.

A number of transverse tool-carrying slides 27 and 28 are also carried by the fixed parts of the machine adjacent the front face of the spindle turret. The latter of these may be provided with any suitable forming tool and is so positioned as to act upon the work carried in the uppermost spindles. The former slide 27, in the present embodiment, is adapted to carry the worm thread generating mechanisms of the present invention.

As stated hereinbefore, it is within the purview of this invention to rotatably drive the worm cutting tool direct from the spindle drive shaft and at a speed conjugate with the rotation of the stock spindles. It is further intended that the mechanism for supporting and driving such cutting tool shall be readily removable from the machine and that certain connections be provided between this mechanism and the tool slide 15 for causing the operation of the former at the proper time. It will appear, therefore, that the present improved thread generating mechanism does not in any way impair the operation of the machine in its ordinary manner, and may be removed when it is not desired to cut external worm threads upon the stock bars. It has been stated that the cutter 30 revolves at a speed conjugate with the rotation of the spindle. This is to prevent any drag of the cutter upon the work and merely establish a rolling engagement therebetween. The mechanism is so designed that the rate of advance of the cutter has nothing to do with the pitch of the threads to be cut, it merely governing the depth of the cut taken from the stock bar, i. e., the amount of metal removed from such stock at each revolution of the spindle.

Figure 3:
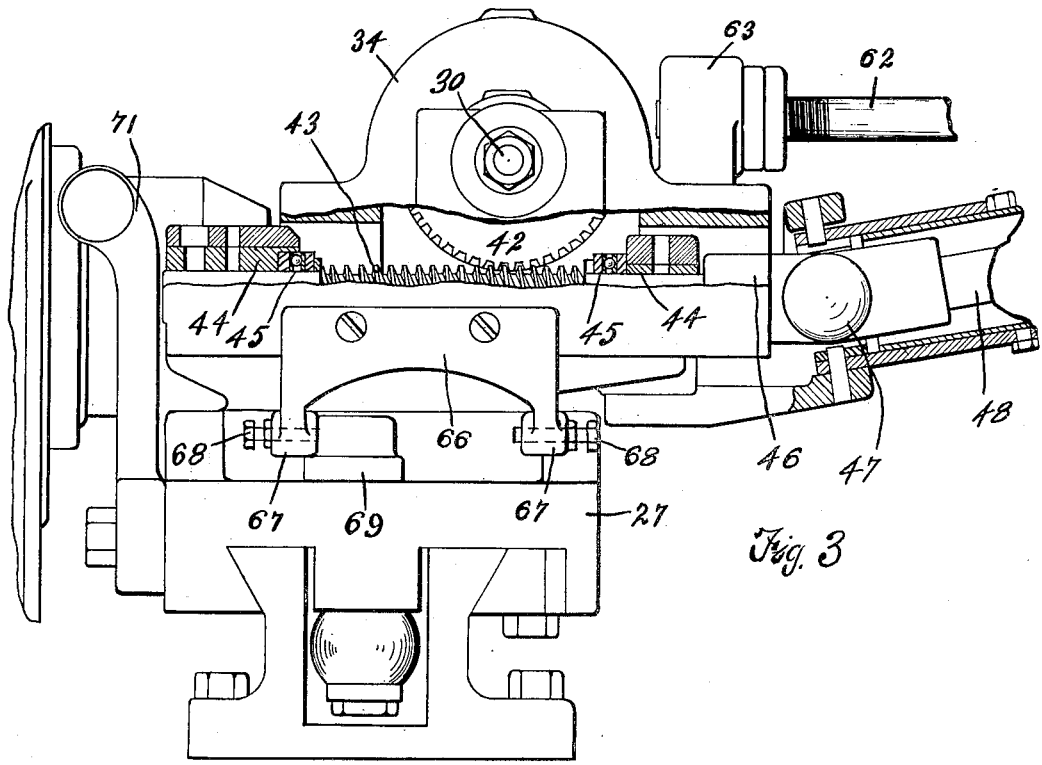
Fig. 3 is a front elevational view on still larger scale, of the worm thread generating mechanism.
Figure 4:
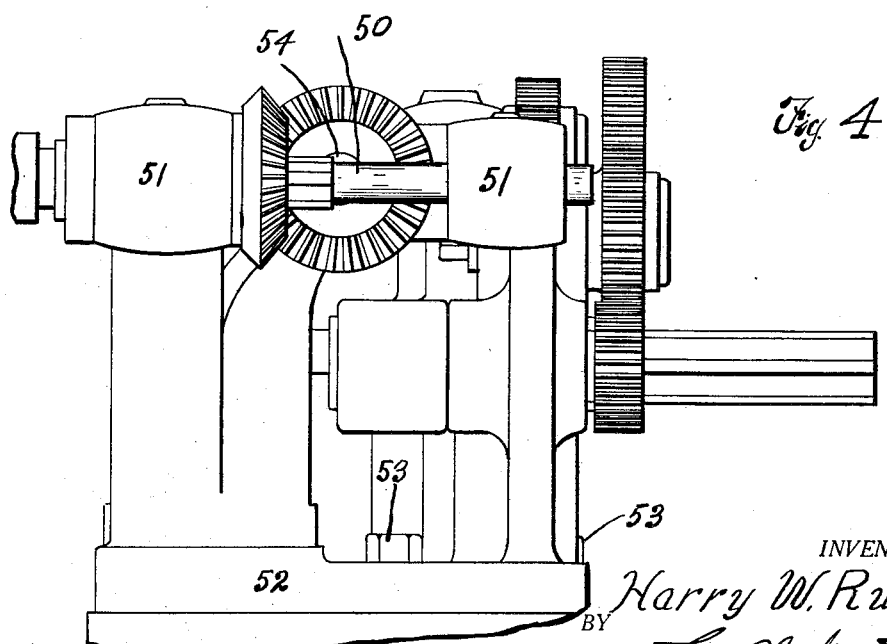
Fig. 4 is a similar view of the driving connections for said mechanism.

The slide 27 which is carried upon transverse guides 31 on the bed plate 10 is moved toward and away from the work in a transverse plane by means of a link 32 the outer end of which may be actuated from any suitable mechanism driven from the cam shaft 26. Upon the upper surface of slide 27 is provided a gib or guideway 33 which extends parallel to the axis of the stock spindles, and slidably carried by such guideway is a carrier 34 in the interior of which is mounted the mechanisms for rotating and controlling the movement of the thread cutter 30. Referring to Figs. 3 and 6, it will be seen that the cutter 30 is removably carried at the forward end of a horizontal transversely extending shaft 35 mounted in a rotatable sleeve 36 journalled in the carrier 34 by bearings 37 and 38. The forward end of shaft 35 is provided with a T-shaped enlargement 39, while the rear end thereof is threaded as at 40, it being apparent from such structure that upon the tightening of a nut 41 threaded on the portion 40 the cutter 30 and the shaft 35 will be locked to the sleeve 36. The bearing 37, which is provided at the forward end of sleeve 36, serves to resist the end thrust of the cutter 30. Intermediate the ends of sleeve 36 is fixedly mounted a worm wheel 42 which engages with a rotatable worm 43 mounted in the carrier 34 at right angles to the shaft 30. This worm 43 is journalled at its ends in suitable bearings 44 and thrust bearings 45 are also provided adjacent each end to offset the thrust encountered through the engagement of the cutter 30 with the work, which of course is transmitted to the worm wheel 42. The end 46 of worm 43 nearest the tool slide 15 is connected through a ball and socket joint 47 to a longitudinally extending shaft 48 which has its other end connected by a similar ball and socket joint 49 to a stub shaft 50. The shaft 50 is journalled in upright projections 51 of a bracket 52 removably secured to the bed plate 10 by means of screws 53. Also carried by the bracket 52 is a second stub shaft 54 arranged at right angles to the shaft 50 and carrying on its ends beveled gears 55 and 56, the latter meshing with a beveled gear 57 secured to the shaft 50. The gear 55 in turn meshes with a beveled gear 58 secured to the drive shaft 21. It will be apparent from the foregoing that through the connections 58—55, 56—57, and worms 43 and 42, the cutter 30 is driven directly from the main drive shaft 21, it being obvious that the ratio of any of the sets of gearing can be so determined to cause the proper speed of the cutter 30 relative to the rotation of the work. By this I mean that the speed of the cutter will be the equivalent of the pitch of the threads to be cut upon the stock and that the movement of the worm wheel 42 with respect to the worm 43 will be merely a rolling one, certain devices being provided, as will appear hereinafter, to prevent the tendency of worm 43 to advance the carriage through its engagement with the worm wheel 42 toward the left of Fig. 3.

Secured to the front face, i. e., the one nearest the spindle turret, of the tool slide 15 is a forwardly projecting arm 60 provided with a transverse aperture 61 in which is received a longitudinally extending rod 62. The forward end of rod 62 is anchored in a boss 63 provided on the upper surface of the carrier 34, and on the other end of such rod is mounted a compression spring 64, which latter member is confined between the rear face of arm 60 and an adjustable nut 65. Manifestly the spring 64 keeps the carrier 34 normally pulled toward the right of Figs. 1 and 2 of the drawings and through such action holds the carrier, and consequently the cutter 30, from longitudinal movement due to the inherent tendency of the worm 43 in its action on the worm wheel 42. An adjustable stop device is provided in connection with the slide 27 and the carrier 34 to limit the longitudinal movement of the latter. In Fig. 3 is seen a plate 66 secured to the outer face of carrier 34 and having depending lugs 67 in which are mounted adjustable stop screws 68. Formed on the slide 27 adjacent the lugs 67 is an outward projection 69 which cooperates with the screws 68 in the manner just described.

Reference has been made hereinbefore to an improved means for moving the thread cutter longitudinally of the work. In the present illustrated embodiment of the invention, this means consists of the arm 60 and cooperating elements in the form of adjustable stop 70 carried on the rod 62. In the operation of the machine, after the stock has been properly fed and gauged in the spindles, the tool carrier 15 is moved to the left of Fig. 2 to bring the tools into engagement with the stock. During this preliminary advance movement of the slide 15, the arm 60 merely slides along the rod 62 and the spring 64 maintains the carrier 34 out of engagement with the work. However, after such slide has advanced a predetermined distance the arm 60 contacts with the adjustable stops 70 and subsequent movement thereof will carry the cutter 30 into engagement with the work.

On the slide 27 is mounted an upright bracket 71 which carries an adjustable projection 73 adapted to cooperate with projections 74 provided on the spindle turret adjacent each of the stock-carrying spindles. The purpose of this construction is to limit the inward movement of the cutter 30, it being apparent therefrom that any irregularity due to the incorrect relative position of the several spindles may be individually taken care of through the adjustment of members 74. It is not uncommon in devices of the present magnitude to have the axes of the several spindles vary several thousandths of an inch from the center of the drive shaft.

Means are also provided by the present invention to regulate or adjust the cutter 30 in a vertical plane relative to the work. As seen in Figs. 6 and 7, the guideway 33, which carries the carrier 34 for relative longitudinal movement, is connected to the upper side of slide 27 by means of studs 80, these latter being positioned at one side of the center of slide 33. In the other side 81 of such slide is mounted an adjustable device by which the slide and carrier may be raised or lowered relative to the slide 27. This device consists of a threaded sleeve 82 received in a threaded aperture 83 in the part 81 and having its lower end 84 contact with the upper surface 85 of slide 27. Through the center of sleeve 83 is passed a stud 86 engaging in a threaded hole 87 in the slide 27 and serving to hold the part 81 in adjusted position. A lock nut 88 is provided to prevent rotation of the sleeve 82 when adjusted.

The use in the foregoing description and following claims of certain terminology is believed to very clearly and properly express the structure defined; the term "paraxial" is used to denote a plurality of members having parallel axes, and the term "transaxial" denotes a member that is arranged transverse to the axis of another member.

I therefore particularly point out and distinctly claim as my invention:

1. In a machine of the character described, the combination of a stock-carrying spindle, a drive shaft, means connecting the same to said spindle, a reciprocating tool slide mounted coaxially of said spindle, a second slide mounted transversely of said spindle, means for moving said second slide toward and away from the spindle, a revoluble thread-cutting tool carried by said second slide, means connecting the same to said drive shaft, and means operated from said first slide for moving said cutter longitudinally of the stock spindle.

2. In a machine of the character described, the combination of a stock-carrying spindle, a drive shaft, means connecting the same to said spindle, a reciprocating tool slide mounted coaxially of said spindle, a second slide mounted transversely of said spindle, means for moving said second slide toward and away from the spindle, a revoluble thread-cutting tool carried by said second slide, means connecting the same to said drive shaft, and means connecting said first named slide to said cutter to move the latter longitudinally of the stock spindle, said means including a lost motion connection.

3. In a machine of the character described, the combination of a stock-carrying spindle, a drive shaft, means connecting the same to said spindle, a reciprocating tool slide mounted coaxially of said spindle, a second slide mounted transversely of said spindle, means for moving said second slide toward and away from the spindle, a revoluble thread-cutting tool carried by said second slide, means connecting the same to said drive shaft, a carrier for said cutter, means keeping said carrier normally away from the stock spindle, and means provided on said first named slide for causing the advance movement of said carrier toward the stock spindle.

4. In a machine of the character described, the combination of a spindle turret, a plurality of stock-carrying spindles mounted therein, a drive shaft for rotating said spindles, a reciprocating tool slide mounted coaxially of said turret, a transverse tool-carrying slide, thread cutting mechanism mounted on said transverse slide, including a revoluble cutter, means for reciprocating said transverse slide, means for reciprocating said first named tool slide, means for driving said cutter from said spindle drive shaft, and means carried by said first named slide for moving said thread cutter paraxially of said spindles.

5. In a machine of the character described, the combination with a spindle turret, a plurality of stock-carrying spindles mounted therein, a drive shaft for rotating said spindles, a reciprocating tool slide mounted coaxially of said turret, a transverse tool-carrying slide, of thread cutting mechanism removably mounted on said transverse slide including a revoluble cutter, detachable gearing carried by said machine adjacent said spindle drive shaft and connected thereto, a flexible drive connection between said gearing and said cutter, and means engaged by said reciprocating tool slide for moving said cutter paraxially of the stock-carrying spindles.

6. In a machine of the character described the combination of a stock carrying spindle, a drive shaft, means connecting the same to said spindle, a reciprocating tool slide mounted coaxially of said spindle, a second tool slide mounted transversely of said spindle, means for moving said second slide towards and away from the spindle, a carrier slidably mounted upon said second tool slide and arranged for reciprocative movement paraxial with said spindle, a revoluble thread cutting tool thereon, means connecting the same to said drive shaft, and means operated from said first slide to effectuate the longitudinal movement of the said carrier and to permit the transverse movement thereof.

7. In a machine of the character described the combination of a stock carrying spindle, a drive shaft, means connecting the same to said spindle, a reciprocating tool slide mounted coaxially of said spindle, a second tool slide mounted transversely of said spindle, means for moving said second slide towards and away from the spindle, a carrier slidably mounted upon said second tool slide and arranged for reciprocative movement paraxial with said spindle, gearing associated with said drive shaft, a flexible shaft rotatably driven by said gearing, gearing mounted in said carrier and driven by said flexible shaft, a cutting tool mounted on said carrier and revolubly driven by said last named gearing and means operated by said first slide for moving said cutting tool longitudinally of said stock spindle.

8. In a machine of the character described the combination of a stock carrying spindle, a drive shaft, means connecting the same to said spindle, a reciprocating tool slide mounted coaxially of said spindle, a second tool slide mounted transversely of said spindle, means for moving said second slide towards and away from the spindle, a third slide mounted upon said second slide, means operated from said first slide for longitudinally reciprocating said third slide, a rotatable cutting tool cammed by said third slide and means carried by said third slide for transmitting rotative movement from said drive shaft to said cutting tool.

9. In a machine of the character described the combination of a stock carrying spindle, a drive shaft, means connecting the same to said spindle, a reciprocating tool slide mounted coaxially of said spindle, a second tool slide mounted transversely of said spindle, means for moving said second slide towards and away from the spindle, a carrier slidably mounted upon said second tool slide and arranged for reciprocative movement paraxial with said spindle, means coordinated with said second slide and said carrier to limit the longitudinal reciprocative movement of said carrier, a revoluble thread cutting tool thereon, means connecting the same to said drive shaft, and means operated from said first slide to effectuate the longitudinal movement of the said carrier and to permit the transverse movement thereof.

10. In a machine of the character described, a bed, a stock carrying spindle, a drive shaft, means connecting the same to said spindle, a reciprocating tool slide mounted coaxially of said spindle, a second tool slide mounted upon said bed, mechanism for moving said second slide transversely towards and from said spindle, said mechanism including linkage connected to said second slide and transversely disposed in relation to said drive shaft, a carrier slidably mounted upon said second tool slide and arranged for reciprocative movement paraxial with said spindle, a revoluble thread cutting tool thereon, means connecting the same to said drive shaft, and means operated from said first slide for moving said cutter longitudinally of the stock spindle.

11. In a machine of the character described the combination of a stock carrying spindle, a drive shaft, means connecting the same to said spindle, a reciprocating tool slide mounted coaxially of said spindle, a second tool slide mounted transversely of said spindle, means for moving said second slide towards and away from the spindle, a carrier slidably mounted upon said second tool slide and arranged for reciprocative movement paraxial with said spindle, means intermediate said second tool slide and said carrier for vertically adjusting said carrier, a revoluble thread cutting tool thereon, means connecting the same to said drive shaft, and means operated from said first slide to effectuate the longitudinal movement of the said carrier and to permit the transverse movement thereof.

12. In a machine of the character described, the combination of a rotatable work carrying spindle, a tool slide mounted coaxially of said spindle and adapted for longitudinal reciprocative movement, a second tool slide mounted transversely of said spindle and adapted for sliding movement, a tool carrier mounted upon the second named tool slide and adapted for longitudinal movement thereon, thread cutting mechanism carried by said second slide including a revoluble cutter, a drive shaft operatively connected with the said work carrying spindle and said thread cutting mechanism and means associated with the second named slide for moving the cutter transversely into cutting engagement with the work at any predetermined point throughout the length thereof.

13. In a machine of the character described, the combination of a rotatable work carrying spindle, a tool slide mounted coaxially of said spindle and adapted for longitudinal reciprocative movement, a rotatable driving shaft for driving said work carrying spindle, a second tool slide mounted transversely of said spindle, means connected thereto for reciprocatively driving the same, a tool carrier mounted upon the second named tool slide, means associated with the said first tool slide for effecting the paraxial reciprocative movement of said tool carrier, thread cutting mechanism carried by said second slide including a revoluble cutter, a drive shaft operatively connected with said work carrying spindle driving shaft and the said thread cutting mechanism, means associated with said drive shaft to facilitate the longitudinal movement of the tool carrier and the transverse movement of the second slide, and means associated with the second slide to limit the movement thereof.

14. In a machine of the character described, the combination of a rotatable drive spindle, a work carrying spindle driven thereby, a longitudinally reciprocatively movable tool slide, a second tool slide reciprocatively driven transverse said spindle, a tool carrier mounted thereon and adapted for reciprocative movement paraxially with said spindle, a worm gear mounted in said second tool slide, a drive shaft operatively connected thereto and with the said drive spindle, a shaft mounted in said tool carrier, a worm wheel affixed to said shaft and intermeshed with said worm gear, a revoluble cutting tool on said shaft, means connected with the first tool slide and with the said tool carrier to effect the movement thereof paraxially with the spindle and connections within said drive shaft to facilitate the movement of said tool carrier independent of the connections with said first tool slide during the translation of the worm wheel over the worm gear.

15. In a machine of the character described, the combination of a rotatable drive spindle, work carrying spindles driven thereby, a reciprocatively movable tool slide, a second tool slide reciprocatively driven transverse said spindle, a tool carrier mounted thereon and adapted for reciprocative movement paraxially with said spindle, a worm gear mounted in said second named slide, a drive shaft connected thereto, gearing associated with said drive shaft and said drive spindle to effect equal revolutions per minute of the said drive spindle and worm, a shaft mounted in said tool carrier, a worm wheel on said shaft intermeshed with said worm gear, a thread generating tool on said shaft, the pitch thereof being equal with the pitch of said worm wheel and a lost motion connection within said drive shaft to facilitate the movement of the tool carrier paraxially with the spindle as effected by the propulsion thereof through the worm and worm wheel.

HARRY W. RUPPLE.